T. J. W. Robertson,
Polishing Glass.
N°. 43,043. Patented June 7, 1864.

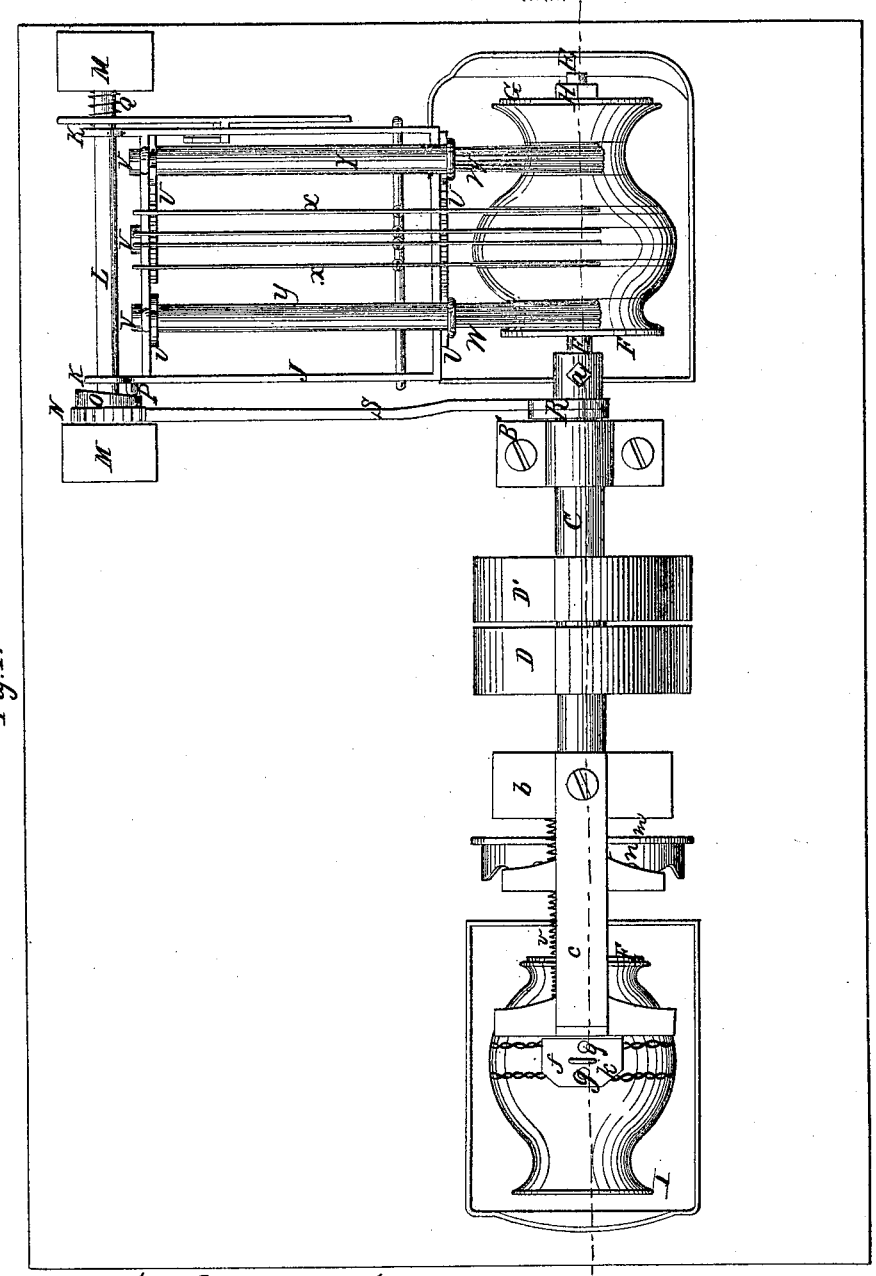

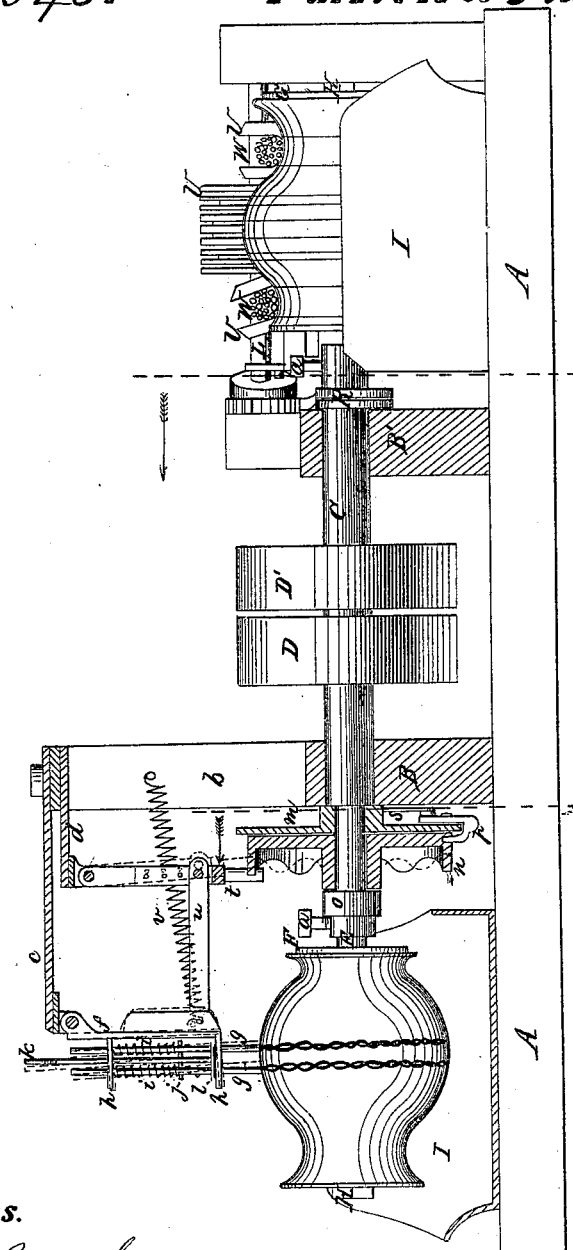

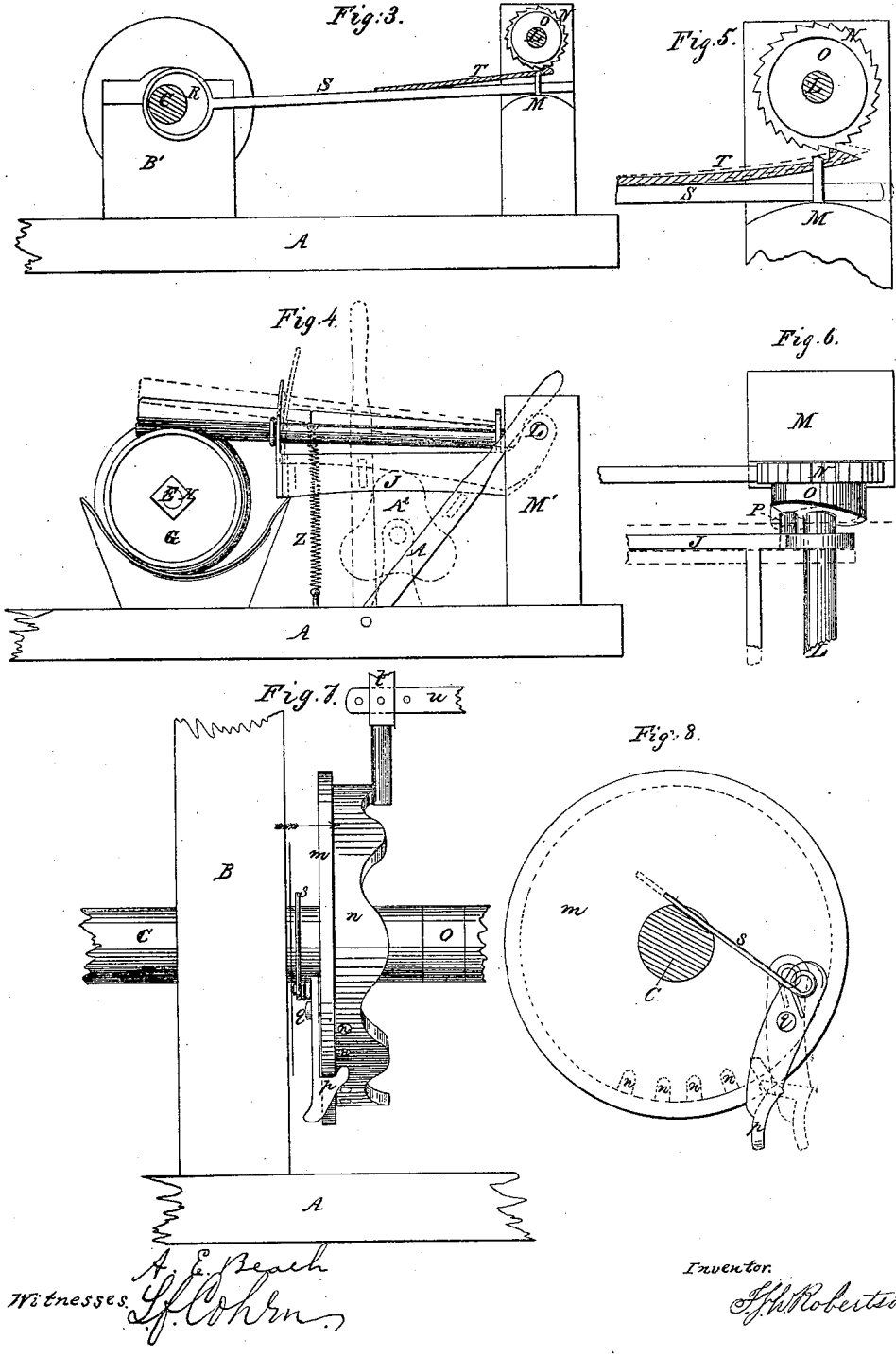

Witnesses
A. E. Beach
S. J. Cohen

Inventor
T. J. W. Robertson

UNITED STATES PATENT OFFICE.

T. J. W. ROBERTSON, OF NEW YORK, N. Y.

MACHINE FOR ORNAMENTING GLASS.

Specification forming part of Letters Patent No. 43,043, dated June 7, 1864.

*To all whom it may concern:*

Be it known that I, T. J. W. ROBERTSON, of the city, county, and State of New York, have invented a new and useful Improvement in Machinery for Ornamenting Glass and Vitreous Substances; and I do hereby declare that the following is a full, clear, and exact description of the same, reference being had to the accompanying drawings, forming part of this specification, in which—

Figure 9:
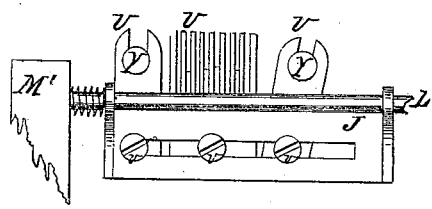
Figure 10:
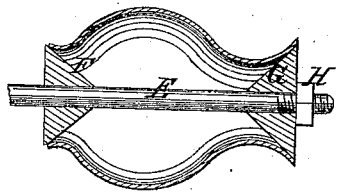
Figure 11:
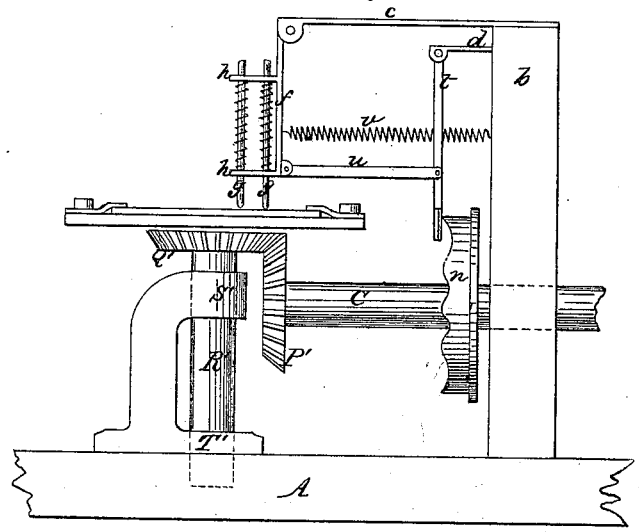
Figure 12:
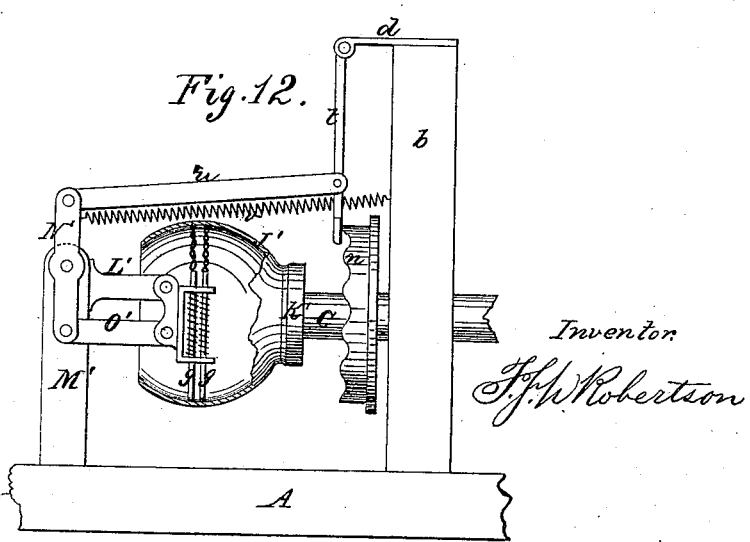

Figure 1, Sheet 1, is a plan of a machine constructed according to my invention. Fig. 2, Sheet 1, is a front view of the same. Figs. 3, 4, 5, 6, 7, 8, 9, and 10, Sheet 2, are views of detached portions of my machine, showing it in detail. Fig. 11, Sheet 3, is a view of a modification of my machine intended to work on flat surfaces. Fig. 12, Sheet 3, is a view of another modification, intended to work inside of "globes" and other articles of similar form.

Similar letters of reference indicate corresponding parts in all of the figures.

The object of my invention, herein described, is to make upon glass shades, globes, lamp-chimneys, table glassware, and other objects, first, wide bands of "roughing" or frosted work, and also narrow lines of various widths, straight around the object operated upon; and, secondly, to make waved lines, either "roughed" upon clear glass or polished upon roughed or frosted glass, these effects being produced by means of self-acting machinery, instead of hand-labor. The usual process of doing this work is to fasten a globe, shade, or other article onto a revolving spindle in a similar way to that shown in the drawings, and for a workman to stand by the machine, holding a wire brush on the object, x, to be ornamented and keeping a supply of sand and water upon it. This would produce a broad band of roughing or frosted work on a shade or globe; but it is impossible to produce sharp, narrow lines in this way. Such lines have to be engraved with a wheel by the ordinary process of engraving. My machine is not only capable of doing this, but will make both broad bands and narrow lines at once, and will make them better and sharper and at a much less cost than that at which it can be done by the old process.

To enable those skilled in the art to which my invention pertains to make and use my machinery, I will proceed to describe the construction and operation of the same.

A A is the stand of the machine, having two standards, B B', rising from it and forming bearings for the main shaft C, which carries the fast and loose pulleys D D'. The shaft C is hollow at each end to allow one of the spindles E E' to be fastened in it at either end by screws a a. Each of these spindles has fastened to it at the end nearest the shaft, C a conical cork, F, against which rests the bottom of the globe or shade to be operated upon, this article being fastened there by another conical cork, G, which is slipped on the spindle E and secured firmly in this position by the nut H. These parts are the same at both ends of the machine. A sectional view of them can be seen at Fig. 10, Sheet 2. Beneath these spindles are the reservoirs I I' to contain the grinding-mixtures of emery or sand and water.

The apparatus for roughing or making the straight bands or lines consists of a frame, J, one end of which rests on the reservoir I, and the other having bearings K K on the shaft L. This shaft runs in bearings in the standards M M, and has securely fastened to it the ratchet-wheel N and cam O. (See Fig. 6, Sheet 2.)

P is a follower on the frame J, which is kept in contact with the face of the cam by the spring Q on the other end of the shaft L.

R is an eccentric on the main shaft C, working the eccentric-rod S, which has a bearing at its other end, upon the standard M, and carrying the spring-pawl T, which acts on the ratchet-wheel N, (see Figs. 3 and 5, Sheet 2,) producing a rotary motion of the shaft L and giving the frame J a sideward motion by the action of the cam O on the follower P, as shown in red outline in Fig. 6, Sheet 2.

On the frame J, at either end, is a series of adjustable guides, U U U, which are adjusted and fastened in their proper position by the screws V V. (See Fig. 9.) These guides U U U are employed to hold and guide the wire brushes W W and metal straps X X. These brushes are made of pieces of straight wire inserted in the holders Y and fastened therein in any convenient manner. The brushes W W are pressed on the shade or other article by the spiral springs Z Z, (see Fig. 4,) and are used for making the broad bands of roughing or frosted work.

For the metal straps X X, I generally use hoop-iron cut to appropriate lengths, and of such thickness as will slide freely in the guides U U. These are used for the narrow lines, and are also held to their work by the springs Z Z.

A' is a lever, used for raising the frame J so as to lift the brushes and straps clear of the glass, so that it (the glass) may be taken out of the machine when finished, as shown in red in Fig. 4, Sheet 2.

When the machine is in operation, the brushes W W and straps X X receive a slow sideward motion with the frame J from the cam O, so that they are always changing their position on the glass. This makes much finer and evener work on the broad bands than would be the case if the brushes always acted exactly in the same place. It also enables the operator, by putting two or more straps in adjoining guides, to make narrow bands of various widths with the same-sized straps, because the band made by one strap will overlap that made by the other one, and so make a band of nearly double the width, as seen by the band made by the two middle straps in the frame J, as shown in Figs. 1 and 2. If preferred, the broad bands can be made the same way by using a sufficient number of straps set close together to make the width required. If the glass is to be roughed all over, a sufficient number of straps or brushes to cover the glass entirely is set as close as possible together, which by the bands made by each brush or strap overlapping the next one, as before explained, will rough the article all over.

The apparatus for producing waved lines consists of a frame, $b$, rising from the standard B, which forms a support for the arms $c\ d$. The arm $c$ has pivoted to it at $e$ the vibrating frame $f$, which carries two or more wire rods, $g\ g$, that slide in guides $h\ h'$. These rods are pressed downward by the spiral springs $i\ i$, acting on the pins $j\ j$.

$k$ is a wire-handle, passing through the guide $h$, and having the lifter $l$ on the lower end of it. This is used for lifting the rods $g\ g$ away from the glass when taking it out of the machine.

On the shaft C there is attached a face plate, $m$, against which is set the pattern-wheel $n$, and is secured there by the collar $o$ in such a manner as to allow it to turn on the shaft C. This pattern-wheel $n$ has cut on it the line intended to be reproduced on the glass. It is prevented from turning on the shaft C by the catch $p$, which is pivoted at $q$ to the face plate $m$, and is pressed into the holes $r\ r\ r$ in the pattern-wheel $n$ by the spring $s$. (These parts are all shown enlarged in Figs. 7 and 8, Sheet 2.) The pattern-wheel $n$ gives motion to the vibrating lever $t$, attached to the arm $d$, which transfers it by the link $u$ to the vibrating frame $f$, which carries the rods $g\ g$. The lever $t$ is kept in contact with the face of the pattern-wheel $n$ by the spring $v$.

It will be seen from this description and a reference to the drawings that as the glass revolves it will be acted on by the rods $g\ g$, which, on receiving a vibrating motion from the pattern-wheel $n$, revolving with the glass, will make a line corresponding with the pattern-wheel $n$. The amount of the vibrating-motion transmitted to the rods $g\ g$ can be varied by changing the connection of the link $u$ with the vibrating lever $t$ from one of the holes, $w\ w$, to another, thus changing the curves of the line made by the rods $g\ g$.

In operating the machine the rods $g\ g$ each make a separate single wavy line around the glass. If desired, another wavy line can be made by the same rod by lifting the catch $p$ and turning the pattern-wheel $n$ on the shaft C, and setting back the catch in a different hole, $r$. On setting the machine in motion the rods $g\ g$ will make another line over the first, thus producing the chain-like design shown in the drawings, Figs. 1 and 2, Sheet 1. If the catch is set in another hole, another line in a different position will be made, so that quite a variety of designs can be made by changing the catch $p$ from hole to hole without detaching the pattern-wheel $n$; but by removing it and substituting others a great variety of designs may be produced.

The same effect as that produced by changing the position of the pattern-wheel may be produced by setting two or more rods, $g\ g$, in the frame $f$ in a line with each other across the machine instead of lengthwise.

The same kind of machinery can be used to cut and polish a series of bright lines on roughed or frosted globes and shades. For this kind of work a machine should be made having both ends alike. It may be constructed so that the same pattern-wheel will control both ends of the machine, or both ends may be made separate and have a separate pattern. The lines are first cut on one end of the machine, as before described, but cut much deeper than is necessary where the lines are intended to be left rough on clear glass. When ground sufficiently deep, the glass is removed and set in the other end of the machine, to polish the lines. The polishing end of the machine is made nearly the same as the cutting end; but the rods $g\ g$ should be made large enough to allow a small hole to be made through them, in which a piece of tin or lead wire or a small piece of some fine-grained wood should be fastened by a screw, or in any other convenient manner, so that the end of the wire or wood will rub in the groove made by the other end of the machine. If the usual polishing-mixture is allowed to run on the lines upon the glass as it revolves, the lead or wood in the ends of the rods $g\ g$ will polish the grooves made by the other end of the machine.

This machinery may be applied to the cutting or engraving upon the inside of globes-shades, and other articles of hollow-ware by an apparatus like that shown in Fig. 12, Sheet 3. In this arrangement the globe J' is fastened in the chuck K' on the end of the shaft C, instead of on the spindle E, as before described; and the vibrating frame $f$, carrying the rods $g\ g$, is hung on the arm L', which projects from the standard M' into the inside of the globe J'. The vibrating frame $f$ receives motion from the pattern-wheel $n^\times$ through the vibrating lever $t$, link $u$, lever T', and link O.'

The described machinery may also be employed for engraving, cutting, and polishing flat glass by changing the machine to the form shown in Fig. 11, Sheet 3. The spindle E is removed and the shaft C is made long enough to receive the bevel gear-wheel P', which gears with another bevel-wheel, Q, on the vertical shaft R', which runs in bearings S and step T'. This vertical shaft carries a table, U', to which is attached the glass V' by the clamps W' W' and screws X' X'. The pattern-wheel $n$, vibrating frame $f$, &c., are all made the same as for operating on globes or other round objects; but for large flat surfaces it would be advisable to change the vibrating motion of the frame $f$ to a reciprocating rectilinear motion, so that a large number of rods, $g\ g$, could be used. This style of machine would produce a series of waving circles, ovals, polygonal figures, &c., similar to those made by engine-turners on metals.

I do not mean to limit myself to the exact form of machinery herein described, as it can be varied to suit the different styles of work and for convenience in operating in many ways without changing the principle of my invention. One change might be made by removing the pattern-wheel from the main shaft C and running it by gearing on another shaft. In this case the pattern-wheel might be made very small, with but one wave on it instead of many, as in the present style; but the pattern-wheel should then revolve several times to each revolution of the main shaft C—as many times as it is intended to have waves around the glass. This can be varied at the will of the operator by changing the relative size of the gear-wheels connecting the main shaft with the pattern-wheel shaft.

In the production of some species of ornamentation it will be desirable to break the lines produced by the brushes, straps, or cutters upon the glass. For this purpose it will only be necessary to introduce under the frame a cam-shaft, $A^2$, as shown in blue, Fig. 4, Sheet 2. This cam-shaft receives rotary motion from the driving-shaft. At every revolution of the cam-shaft the frame is lifted, and the straps or brushes are thus raised so that they cannot touch the glass, and thus breaks in the lines produced upon the glass will be made. These breaks may be varied at will by changing the form of the cam, and the straps or brushes may be all lifted together, or only a portion of them, or be made to rise and fall alternately to and from the glass, according to the formation of the cam-shaft.

Having thus described my invention, what I claim as new in the art of ornamenting vitreous substances, and desire to secure by Letters Patent, is—

1. A mechanism for polishing, ornamenting, and roughing glass, in which the glass rotates while the brushes, straps, polishers, or their equivalents simply rest or press upon the glass with a yielding pressure, substantially as herein shown and described.

2. The production of wave, spiral, or intersecting lines upon the glass by giving to the brushes, straps, polishers, or their equivalents a movement across the line of rotation of the glass by automatic mechanism.

3. The vibrating lever $t$ and adjustable link $u$, employed to communicate a variable motion from the pattern-wheel to the frame $f$, as explained.

4. The combination of the catch $p$ and spring $s$, operating in the manner described, to secure the pattern-wheel $n$ upon the face plate $m$.

T. J. W. ROBERTSON.

Witnesses:
S. F. COHEN,
A. E. BEACH.